June 1, 1948.  H. T. KRAFT  2,442,499
REPAIR VULCANIZING APPARATUS
Filed Feb. 8, 1945  4 Sheets-Sheet 1

INVENTOR.
Herman T. Kraft
BY
Evans + McCoy
ATTORNEYS

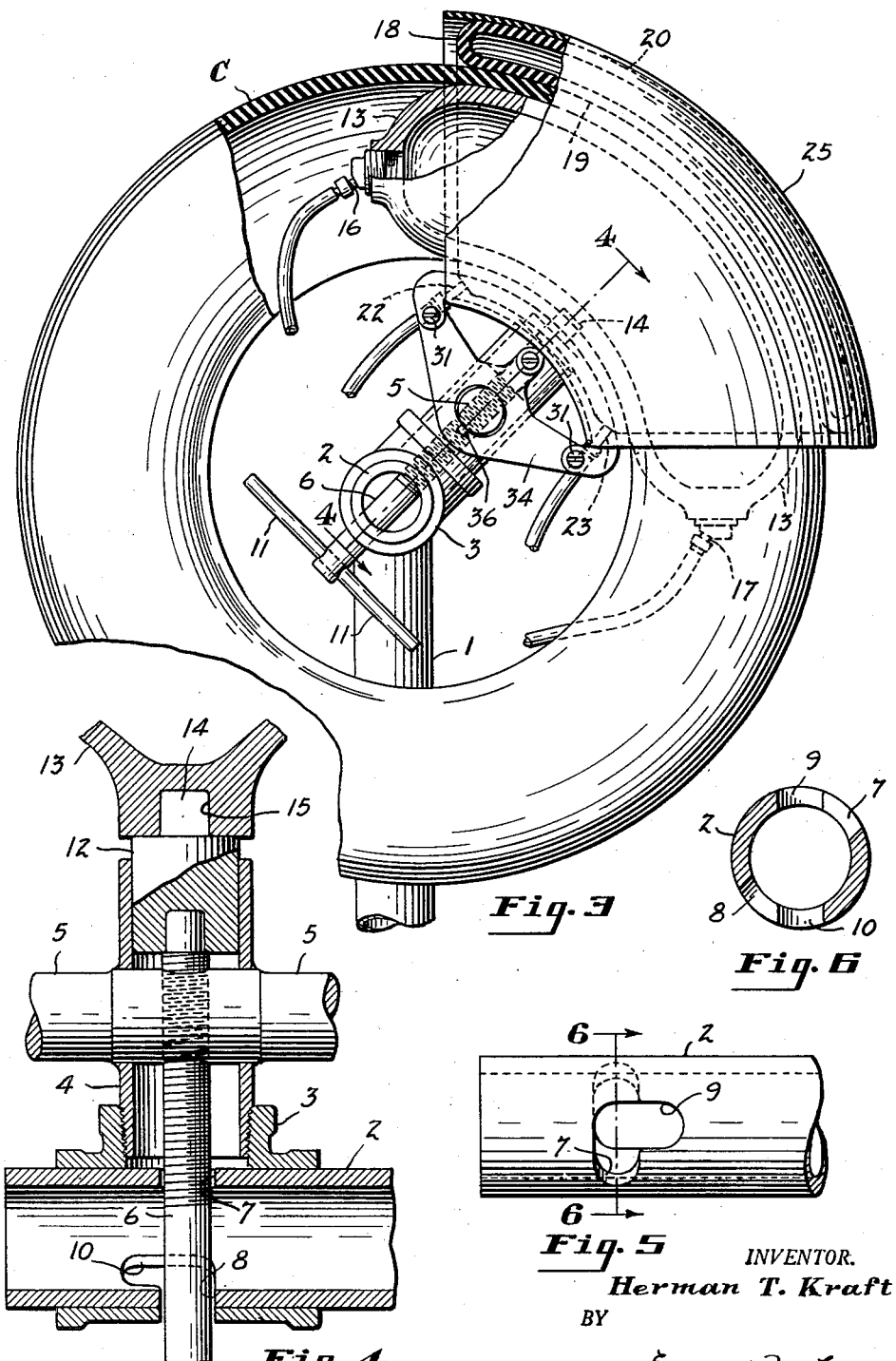

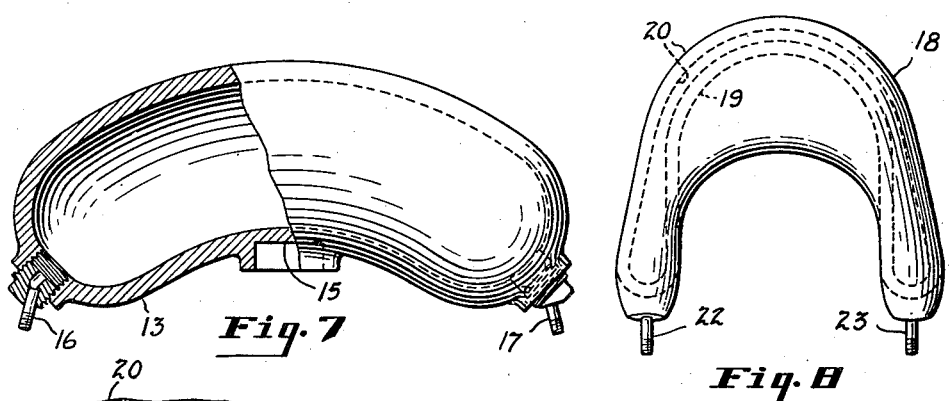
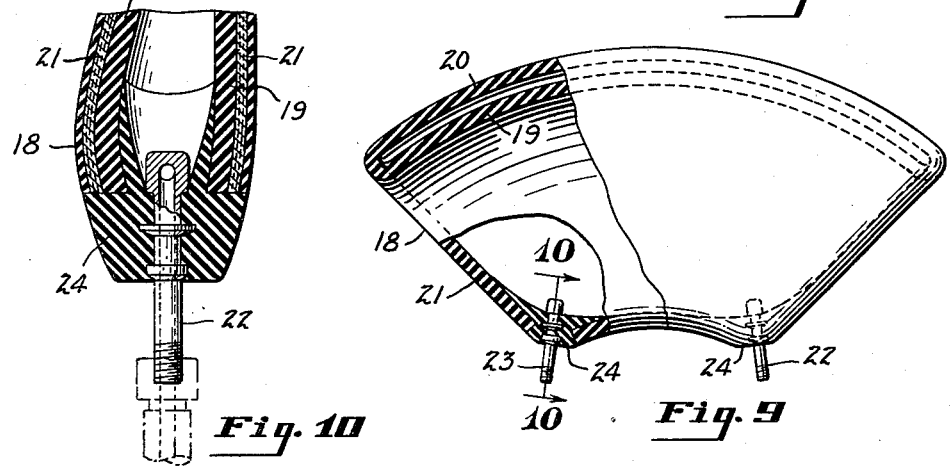
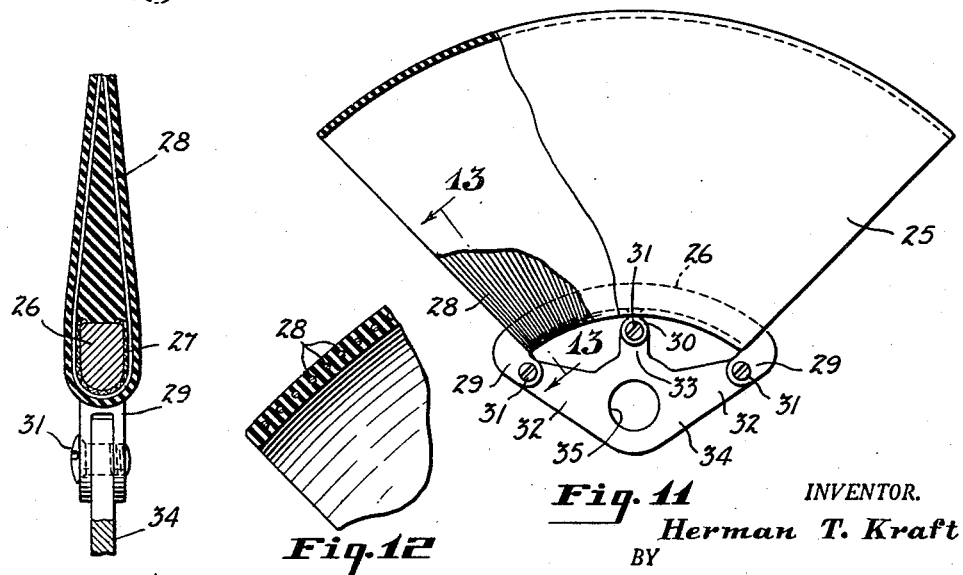

Patented June 1, 1948

2,442,499

UNITED STATES PATENT OFFICE 2,442,499

REPAIR VULCANIZING APPARATUS

Herman T. Kraft, Akron, Ohio, assignor to The General Tire & Rubber Company, Akron, Ohio, a corporation of Ohio Application February 8, 1945, Serial No. 576,727

4 Claims. (Cl. 18—18)

This invention relates to vulcanizing apparatus of the type in which heat is applied to a portion of a tire casing for vulcanizing patches or other repair material.

The invention has for an object to provide a vulcanizing apparatus of the character described, in which the mounting of the tire casing in and its removal from the vulcanizer is facilitated.

A further object of the invention is to increase the speed of vulcanization by a more direct application of heat to the material to be vulcanized.

An additional object of the invention is to improve the quality of the repair by insuring the maintenance of uniform pressure upon the material to be vulcanized during the vulcanizing operation.

It is also an object of the invention to provide a repair vulcanizer that is readily applicable to tires of different sizes.

With the above and other objects in view, the invention may be said to comprise the vulcanizer as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which Fig. 1 is a front elevation of a vulcanizing stand provided with two vulcanizers embodying the invention, one of the vulcanizers and the tire casing to which it is applied being shown in transverse vertical section;

Fig. 3 is a fragmentary side elevation with parts in section showing the apparatus in vulcanizing position;

Fig. 4 is a vertical section on an enlarged scale through the core supporting standard and the supporting arm upon which it is mounted;

Fig. 5 is a fragmentary top elevation of the supporting arm upon which the core standard is supported;

Fig. 6 is a section taken on the line indicated at 6—6 in Fig. 5;

Fig. 7 is a side elevation of the core, one end of which is broken away and shown in section;

Fig. 8 is an end elevation of the inflatable bag;

Fig. 9 is a side elevation of the bag with a portion broken away and shown in section;

Fig. 10 is a section on an enlarged scale taken on the line indicated at 10—10 in Fig. 9;

Fig. 11 is a side elevation of the flexible cover member;

Fig. 12 is a fragmentary enlarged view of one of the wire positioning bars of the cover member, and Fig. 13 is a section on an enlarged scale taken on the line indicated at 13—13 in Fig. 11.

Figure 1:
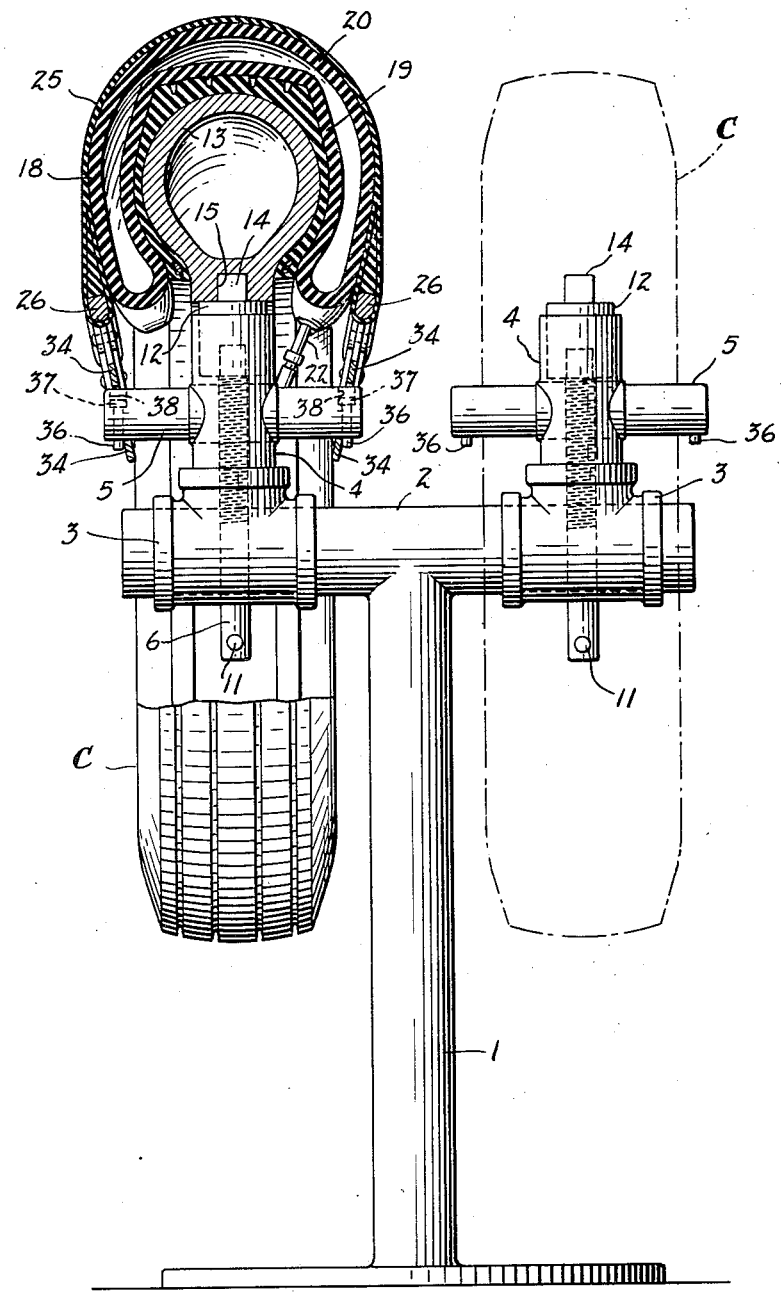
Figure 2:
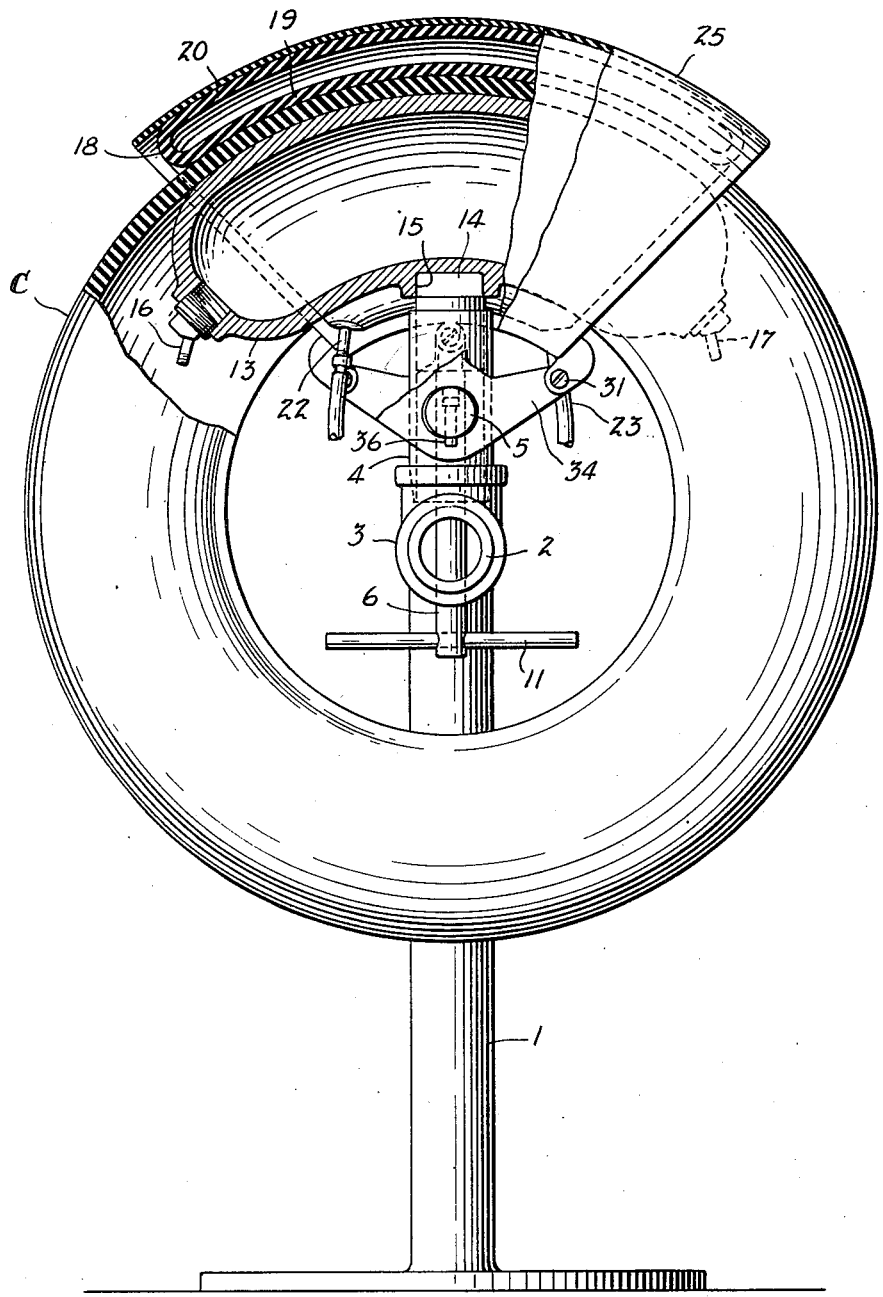
Fig. 2 is a side elevation of a vulcanizer, showing the same applied to a tire, a portion of the vulcanizer and the tire casing being broken away and shown in section.

In the accompanying drawings two identical vulcanizing units embodying the present invention are shown mounted upon a pedestal 1 which has a horizontal bar at the top thereof which is preferably of tubular form projecting to opposite sides of the pedestal 1 to provide supporting arms 2 for the two vulcanizing units.

Referring to the unit illustrated in detail, the tubular supporting arm 2 has a collar 3 rotatably mounted thereon, to which is attached a tubular post 4 which is normally supported in upright position on the arm 2. A horizontal cross arm 5 extends diametrically through the tubular post 4 and is rigidly attached to the post 4 by suitable means such as welding. A vertical screw 6 mounted centrally within the post 4 is threaded in a diametrical opening in the cross arm 5 and extends through the collar 3 and through arcuate slots 7 and 8 in the top and bottom of the tubular arm 2. The slots 7 and 8 have axially extending portions 9 and 10 which are in vertical alinement and which serve to retain the standard in vertical position. When the standard is in vertical position the screw 6 is in alinement with the extensions 9 and 10, and the standard 4 and collar 3 may be moved laterally on the arm 2 to engage the screw 6 in the slots 9 and 10 to hold the post in upright position. When the screw 6 is alined with the arcuate portion of the slot, the post 4 may swing laterally until the screw 6 engages the ends of the arcuate slots.

The screw 6 has a handle 11 at its lower end and an extension 12 slidably mounted in the upper end of the post 4 is seated upon the upper end of the screw 6. By turning the screw 6 the extension 12 may be raised or lowered in the post 4. The post 4 and extension 12 form an extensible standard for supporting an elongated rigid core member 13 which is hollow and shaped to fit within a pneumatic tire casing. The extension 12 has a rectangular upper end portion 14 that fits within a socket 15 in the under side of an elongated hollow core member 13 to detachably support the core member so that core members may be readily interchanged for tires of different sizes. The core member 13 serves as a heating element, being provided with a steam inlet 16 at one end and a drain outlet 17 at its opposite end. The standard and core member supported on the arm 2 are of a height such that a pneumatic tire casing C may be readily positioned with a portion thereof fitting over the core 13 and with its center plane centrally disposed with respect to the supporting standard.

The tire casing C is engaged exteriorly by an inflatable bag 18 that has an inner wall 19 that is arched to provide a recess to receive a tire casing and an outer flexible wall 20 that is of substantially the same shape as the inner wall 19. The bag is formed of rubber with a fabric reinforcement 21 that is so disposed therein as to resist circumferential and radial extension of the bag when inflated. The bag 18 preferably serves as an additional heating element on the exterior of the tire casing, and may be provided adjacent one end with a steam inlet 22 and adjacent the opposite end with a drain attachment 23, the attachments 22 and 23 being mounted in a rubber block 24 that is inserted in the inner corners of the bag and integrally joined to the bag by vulcanization.

In order to cause fluid pressure within the bag 18 to be exerted substantially uniformly upon the exterior of the tire casing, a bag confining cover 25 is provided, which is of arched form to fit around the exterior of the air bag, the wall of the cover being thin and flexible so that the outer wall of the air bag may assume a substantially circular cross section form under inflation pressure. The cover is formed of rubber vulcanized to arched shape, and has bars 26 embedded in the ends thereof, the bars being provided with spaced grooves 27 to receive reinforcing wires 28 that extend from one end of the cover to the other and that are embedded in the cover, the wires 28 being looped over the bars 26 at the ends of the cover member.

The bars 26 are provided with end eyelets 29 and intermediate eyelets 30 which are attached by means of screws 31 to end and intermediate arms 32 and 33 of anchoring members 34. Each anchoring member 34 has a hole 35 of a size to receive an end of the cross bar 5, so that the cover can be placed over the bag on the tire casing and the anchoring members 34 can be slipped over the ends of the cross bar 5. The cross bar 5 carries a locking pin 36 at each end that is mounted in a vertical bore in the cross bar 5, each pin 36 being provided with a head 37 slidable in a counterbore 38, the depth of the counterbore being such that the pin normally projects a short distance below the bottom of the bar 5. When the anchoring members are placed on the cross arm 5 the pins 36 are lifted with the finger to permit the anchoring members to pass, after which the pins are released and drop by gravity to their locking position shown in Fig. 1.

In the operation of the device, the core supporting standard is first placed in vertical position with the screw 6 engaging in the slots 9 and 10 and with the core member 13 in its lowermost position. The tire casing is then slipped over the end of the arm 3 and over the top of the core 13 and then lowered upon the core 13 to the position shown in Fig. 1. The air bag 18 is then placed over the tire casing and around the core 13 and the cover 25 is thrown over the air bag and its anchoring plates attached to the cross bar 5, as shown in Fig. 1, after which the screw 6 is turned by means of the handle 11 to elevate the core 13, pressing the tire casing upwardly against the interior of the air bag and drawing the confining cover 25 taut against the exterior wall of the inflatable bag. After the cover has been tautened by adjusting the core 13 the unit is moved laterally on the arm 2 to aline the screw 6 with the arcuate slots 7 and 8 and the supporting standard and associated parts of the vulcanizer are allowed to tilt to the position shown in Fig. 3, whereupon steam under pressure is admitted through the inlet 16 to the core 13 and through the inlet 22 to the inflatable bag 18 to apply heat to the patch or other repair to be vulcanized that is confined between the core and the bag. In the tilted position the drain outlet 17 of the core and the drain outlet 23 of the bag are at the lowermost ends of the bag and core so that water of condensation may drain freely from the core and bag.

After heat has been applied for a sufficient length of time to vulcanize the repair, the vulcanizing apparatus is returned to upright position and the steam connections are disconnected, after which the screw is adjusted by means of the handle 11 to lower the core and slacken the cover so that the anchoring members 34 can be readily detached from the cross arm 5, permitting a quick and easy removal of the cover and bag from the tire casing and a quick removal of the tire casing from the cover.

The apparatus of the present invention is conveniently applicable to tires of different sizes. The core member 13 which is preferably made of a light metal such as aluminum, can be easily detached and replaced with a core of a larger or smaller size and the inflatable bag 18 and cover 25 because of their flexibility are applicable to tires that vary considerably in size.

It is to be understood that variations and modifications of the specific apparatus herein shown and described for purposes of illustration may be made without departing from the spirit of the invention.

What I claim is:

1. A tire repair vulcanizer comprising a horizontal supporting arm, a standard carried by said arm, said standard having a lower section and an upper section telescopically connected to the lower section, an elongated hollow steam receiving core shaped to fit within a tire casing and attached to the upper section of the standard, an inflatable bag shaped to conform to the exterior of the portion of the tire casing fitting on the core, a flexible cover engaging the outer surface of the bag and attached to the lower section of said standard, and means for raising the upper section of said standard to tauten the cover member on the bag.

2. A tire repair vulcanizer comprising a horizontal supporting arm, a standard carried by said arm, said standard having a lower section and an upper section telescopically connected to the lower section, an elongated hollow steam receiving core shaped to fit within a tire casing and attached to the upper section of the standard, an inflatable bag shaped to conform to the exterior of the portion of the tire casing fitting on the core, a flexible cover engaging the outer surface of the bag and attached to the lower section of said standard, steam inlet and drain attachments at opposite ends of said core and bag, means for shifting the upper section of said standard with respect to the lower to tauten said cover, and means for supporting said standard in an inclined position to facilitate drainage of liquid from the core.

3. In a tire repair vulcanizer, a support, a tubular upright carried by said support, a cross bar extending through said upright, an extension member slidably mounted in the upper end of said tubular upright, a hollow elongated steam receiving core mounted on said extension member and shaped to fit within a tire casing, a screw threaded in said cross bar and engaging said extension member to adjust the same, a flexible cover member adapted to extend around the portion of the tire casing on said core, and means for detachably connecting the ends of said cover member to the cross bar on opposite sides of the upright.

4. In a tire repair vulcanizer, a support comprising a horizontal arm and a short standard pivoted to said arm, means for restricting the pivotal movement of the standard on said arm to movement in one direction from a vertical to an inclined position, a hollow arcuate core disposed transversely of the pivotal axis of the standard and attached substantially midway between its ends to the upper end of said standard, said core being shaped to fit within a tire casing, said core having a steam inlet and a drain outlet at the end thereof toward which said standard moves from its vertical position, said core, standard and arm being dimensioned to permit mounting of a tire casing in vertical position thereon with said casing encircling the core standard and arm, a flexible cover for securing the tire casing to the core, said cover extending around the portion of the tire casing on the core and attached at its ends to said support, means for holding said standard in vertical position for the assembly of the tire casing with the core and cover, said holding means being releasable to permit the core and standard to swing to inclined position for vulcanizing.

HERMAN T. KRAFT.

REFERENCES CITED

The following references are of record in the file of this patent:

UNITED STATES PATENTS

| Number | Name | Date |
|---|---|---|
| 1,294,865 | Booth | Feb. 18, 1919 |
| 1,623,677 | Heintz | Apr. 5, 1927 |
| 1,637,879 | Semler | Aug. 2, 1927 |
| 1,721,094 | Sease | July 16, 1929 |
| 2,112,440 | James | Mar. 29, 1938 |
| 2,344,158 | Maze | Mar. 14, 1944 |